United States Patent [19]

Matsuoka et al.

[11] Patent Number: 4,646,535
[45] Date of Patent: Mar. 3, 1987

[54] TEMPERATURE AND PRESSURE MONITORED REFRIGERATION SYSTEM

[75] Inventors: Akio Matsuoka, Obu; Masashi Takagi, Kariya; Akiro Yoshimi, Obu; Kazutoshi Nishizawa, Toyoake, all of Japan

[73] Assignee: Nippondenso Co., Ltd., Kariya, Japan

[21] Appl. No.: 775,016

[22] Filed: Sep. 11, 1985

[30] Foreign Application Priority Data

Sep. 14, 1984 [JP] Japan .................. 59-193038

[51] Int. Cl.⁴ .............................................. F25B 1/00
[52] U.S. Cl. ................... 62/228.5; 62/156; 62/228.3; 62/323.4; 165/43
[58] Field of Search ................ 62/323.4, 228.4, 228.5, 62/228.3, 156; 165/43

[56] References Cited

U.S. PATENT DOCUMENTS

| | | | |
|---|---|---|---|
| 2,978,879 | 4/1961 | Heidorn | 62/323.4 X |
| 3,363,429 | 1/1968 | Wechsler et al. | 62/156 |
| 4,132,086 | 1/1979 | Kountz | 62/209 |
| 4,358,936 | 11/1982 | Ito et al. | 62/323.4 X |
| 4,456,055 | 6/1984 | Yoshimi et al. | 165/43 X |
| 4,463,576 | 8/1984 | Burnett et al. | 62/228.3 |
| 4,471,632 | 9/1984 | Nishi et al. | 62/228.5 X |
| 4,476,692 | 10/1984 | Nishi et al. | 62/228.5 |
| 4,480,443 | 11/1984 | Nishi et al. | 62/228.5 X |
| 4,485,635 | 12/1984 | Sakano | 62/228.5 X |
| 4,495,778 | 1/1985 | Shaw | 62/228.5 X |
| 4,498,311 | 2/1985 | Sakano et al. | 62/228.5 X |
| 4,506,517 | 3/1985 | Dandzik | 62/228.5 X |
| 4,507,932 | 4/1985 | Suzuki et al. | 62/228.3 X |
| 4,539,823 | 9/1985 | Nishi et al. | 62/228.5 |

FOREIGN PATENT DOCUMENTS 55-77659 6/1980 Japan .
58-155287 9/1983 Japan .

Primary Examiner—Albert J. Makay
Assistant Examiner—Steven E. Warner
Attorney, Agent, or Firm—Cushman, Darby & Cushman

[57] ABSTRACT

A refrigeration system comprises a refrigeration cycle including a compressor of a variable capacity type for compressing a refrigerant and an evaporator for evaporating the compressed refrigerant. A driving source is connected to the compressor through a clutch movable between an engaged position and a disengaged position. A first detector detects pressure of the refrigerant evaporated by the evaporator to generate a signal. A second detector detects temperature relating to a cooling condition of the evaporator to generate a signal. A capacity control unit controls a discharge capacity of the compressor so as to cause the pressure detected by the first detector to approach an aimed pressure. A clutch control unit is operative in response to the signals from the respective first and second detectors to judge a condition of frosting on the evaporator for controlling the clutch for movement between the engaged and disengaged positions and to judge an insufficiency in quantity of the refrigerant in the refrigeration cycle for controlling the clutch for movement to the disengaged position.

18 Claims, 11 Drawing Figures

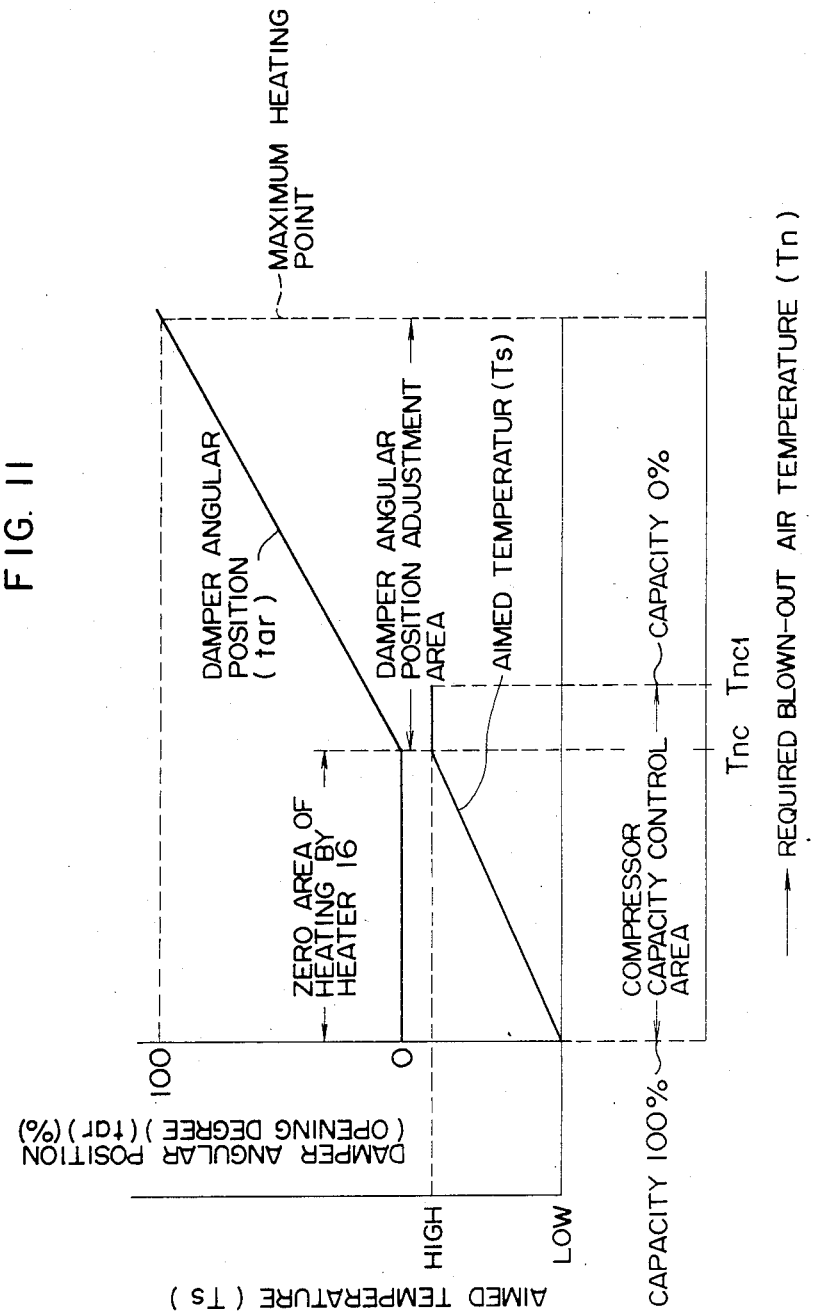

TEMPERATURE AND PRESSURE MONITORED REFRIGERATION SYSTEM

BACKGROUND OF THE INVENTION

1. Field of the Invention

This invention relates to refrigeration systems, and specifically, to a refrigeration system for air-conditioning of a vehicle to cool and dehumidify a vehicle compartment, for example. More particularly, this invention relates to a refrigeration system in which a discharge capacity of a compressor is satisfactorily controlled in relation to variation in the air-conditioning state, while means is provided for preventing frost from accumulating on an evaporator and for preventing leakage of a refrigerant gas from occurring.

2. Background of the Invention

A refrigeration cycle of air-conditioning for an automotive vehicle is usually comprised of a compressor, a condenser, a pressure reducing device such as an expansion valve, an evaporator and a piping for connecting these components to each other. Refrigerant in the form of mist in the evaporator is evaporated, and air in contact with the evaporator is cooled by absorption of the latent heat upon the evaporation of the refrigerant.

Heretofore, it has been proposed in such a refrigeration cycle to detect the evaporating pressure of the refrigerant in the evaporator to vary the discharge capacity of the compressor in order to maintain the evaporating pressure at a desired value. For example, when the cooling load rises so that the cooling capacity of the evaporator cannot follow the load, the temperature of the refrigerant gas in the evaporator will rise so that the evaporating pressure tends to rise. In order to suppress such a rise in the evaporating pressure, the compressor is feed-back controlled so as to be shifted toward a higher capacity side, to maintain the evaporating pressure in the vicinity of a predetermined value.

Such a conventional control, however, cannot cope with the leakage of the refrigerant, and the danger that a seizure of the compressor might occur. For example, as the evaporating pressure of the refrigerant in the evaporator decreases due to the leakage of the refrigerant during the operation of the refrigeration cycle, the discharge capacity of the compressor is controlled toward a lower capacity side, so that the quantity of lubricant which is circulated to the compressor together with the refrigerant will decrease thereby tending to cause the problem of the seizure.

Further, if the capacity control of the compressor cannot cause the cooling capacity of the evaporator to sufficiently cope with the variation in the cooling load, frosting on the evaporator might occur.

OBJECT AND SUMMARY OF THE INVENTION

It is an object of this invention to provide a refrigeration system in which when a compressor is controlled in capacity, signals for the capacity control are utilized to prevent a seizure of the compressor due to leakage of refrigerant and to positively prevent frosting on an evaporator.

According to this invention, there is provided a refrigeration system comprising a refrigeration cycle including a compressor having a variable capacity for compressing a refrigerant, and an evaporator connected to the compressor for evaporating the compressed refrigerant; a driving source for driving the compressor; clutch means movable between an engaged position where the driving source is drivingly connected to the compressor to allow the driving force from the driving source to be transmitted to the compressor and a disengaged position where the driving source is disconnected from the compressor to prevent the driving force from the driving source from being transmitted to the compressor; first detecting means for detecting pressure of the refrigerant evaporated by the evaporator to generate a signal representative of the pressure; second detecting means for detecting temperature relating to a cooling condition of the evaporator to generate a signal representative of the temperature; capacity control means for controlling a discharge capacity of the compressor to cause the pressure detected by the first detecting means to approach an aimed pressure; and clutch control means operative in response to the signal from the first detecting means and the signal from the second detecting means for judging whether or not frosting occurs on the evaporator to control the clutch means so as to move the same to the disengaged position when it is judged that the frosting occurs on the evaporator, and to move the clutch means to the engaged position when it is judged that no frosting occurs on the evaporator, and for judging whether or not the refrigerant in the refrigeration cycle is insufficient in quantity to control the clutch means so as to move the same to the disengaged position when it is judged that the refrigerant in the refrigeration cycle is insufficient in quantity.

According to the present invention, there is further provided a refrigeration cycle including a compressor having a variable capacity for compressing a refrigerant, and an evaporator connected to the compressor for evaporating the compressed refrigerant; a driving source for driving the compressor; clutch means movable between an engaged position where the driving source is drivingly connected to the compressor to allow the driving force from the driving source to be transmitted to the compressor and a disengaged position where the driving source is disconnected from the compressor to prevent the driving force from the driving source from being transmitted to the compressor; first detecting means for detecting pressure of the refrigerant evaporated by the evaporator to generate a signal representative of the pressure; second detecting means for detecting temperature relating to a cooling condition of the evaporator to generate a signal representative of the temperature; third detecting means for detecting at least one physical amount relating to a cooling load; capacity control means operative in response to the signal from the second detecting means and signal from the third detecting means to determine an aimed pressure for controlling a discharge capacity of the compressor to cause the pressure detected by the first detecting means to approach the aimed pressure; and clutch control means operative in response to the signal from the first detecting means and the signal from the second detecting means for judging whether or not frosting occurs on the evaporator to control the clutch means so as to move the same to the disengaged position when it is judged that the frosting occurs on the evaporator, and to move the clutch means to the engaged position when it is judged that no frosting occurs on the evaporator, and for judging whether or not the refrigerant in the refrigeration cycle is insufficient in quantity to control the clutch means so as to move the same to the disengaged position when it is judged that the refrigerant in the refrigeration cycle is insufficient in quantity.

In accordance with the present invention, the detecting signal of the evaporating pressure by the first detecting means and the detecting signal of the temperature by the second detecting means are utilized in combination to enable the capacity control of the compressor, the control for the prevention of the frosting from occurring on the evaporator and the control for coping with the leakage of the refrigerant to be advantageously performed with a simple construction.

Further, in accordance with this invention, in addition to the above advantages, the detecting signal of the cooling load by the third detecting means is additionally utilized to perform the capacity control of the compressor, to thereby enable the capacity control to rapidly follow the variation in the cooling load and to be performed accurately.

BRIEF DESCRIPTION OF THE DRAWINGS

FIG. 11 is a graph showing the relationship between a capacity control area and a damper adjusting area in the refrigeration system shown in FIG. 9.

DETAILED DESCRIPTION OF THE PREFERRED EMBODIMENTS

Figure 1:
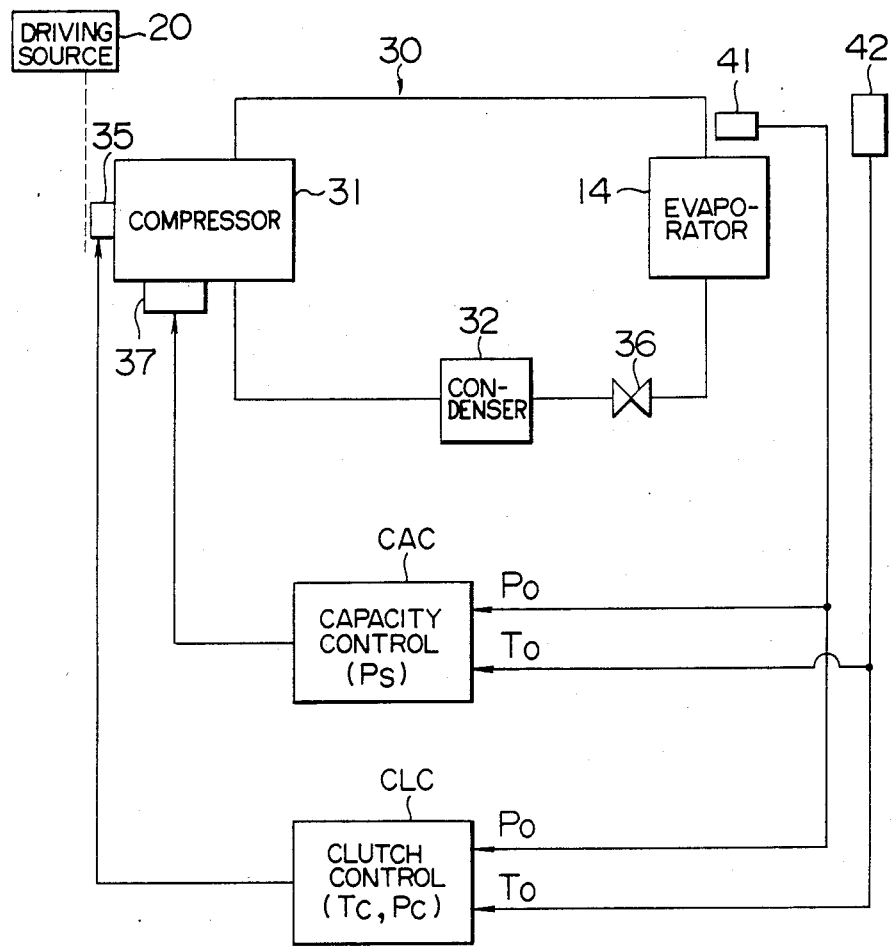
FIG. 1 is a block diagram illustrating a first technical concept of the present invention.

Referring now to FIG. 1, a refrigeration system in accordance with a first technical concept of the present invention comprises a refrigeration cycle 30 which includes a compressor 31 having a variable capacity for compressing a refrigerant, and an evaporator 14 connected to the compressor 31. A driving source such as an engine 20 mounted on a vehicle, for example, is adapted to drive the compressor 31. Clutch means 35 is movable between an engaged position where the driving source 20 is drivingly connected to the compressor 31 to allow the driving force from the driving source 20 to be transmitted to the compressor 31 and a disengaged position where the driving source 20 is disconnected from the compressor 31 to prevent the driving force from the driving source 20 from being transmitted to the compressor 31. First detecting means such as a pressure sensor 41, for example, is provided for detecting pressure of the refrigerant evaporated by the evaporator 14 to generate a signal Po representative of the pressure. Second detecting means such as a temperature sensor 42, for example, is provided for detecting temperature relating to a cooling condition of the evaporator 14 to generate a signal To representative of the temperature. Capacity control means CAC is provided for controlling a discharge capacity of the compressor 31 to cause the pressure detected by the first detecting means 41 to approach an aimed or desired pressure Ps. Clutch control means CLC is operative in response to the signal Po from the first detecting means 41 and the signal To from the second detecting means 42 for judging whether or not frosting occurs on the evaporator 14 to control the clutch means 35 so as to move the same to the disengaged position when it is judged that the frosting occurs on the evaporator 14, and to move the clutch means 35 to the engaged position when it is judged that no frosting occurs on the evaporator 14, and for judging whether or not the refrigerant in the refrigeration cycle 30 is insufficient in quantity to control the clutch means 35 so as to move the same to the disengaged position when it is judged that the refrigerant in the refrigeration cycle 30 is insufficient in quantity.

The refrigeration cycle 30 may be of a known construction including, in addition to the compressor 31 and the evaporator 14, a condenser 32 and an expansion valve 36 which forms a pressure reducing device. The compressor 31 may comprise any compressor which can vary its discharge capacity continuously or discontinuously (in a stepped manner) by means of a capacity varying mechanism 37.

The control of the capacity varying mechanism 37 may be performed by the controlling the opening and closing of an electromagnetic valve by the magnitude of a duty ratio, which valve controls the back pressure of a capacity adjusting member, as is publicly known from Japanese Patent Laid-open No. 58-155287, for example.

The compressor 31 is driven by the driving source 20 through the cluch means such as an electromagnetic valve 35, for example, to perform the operation of the refrigeration cycle 30.

The first detecting means 41 may detect pressure of the refrigerant evaporated by the evaporator 14, pressure of the refrigerant drawn into the compressor 31 or the like. The second detecting means 42 may detect temperature of the air blown out of the evaporator, temperature of surfaces of fins in the evaporator, temperature within an outlet pipe of the evaporator, temperature of the refrigerant at an outlet of the evaporator, a temperature difference across the evaporator, or the like.

The aimed pressure Ps in the capacity control means CAC may be determined based on the temperature signal To from the second detecting means 42, for example. In the clutch control means CLC, the judgement on the frosting condition on the evaporator 14 may be performed by the comparison of the temperature signal To from the second detecting means 42 and a predetermined set value Tc with each other, for example; on the insufficiency in quantity of the refrigerant may be performed by the comparison of the pressure signal Po from the first detecting means 41 and a predetermined set value Pc with each other, for example.

Figure 2:
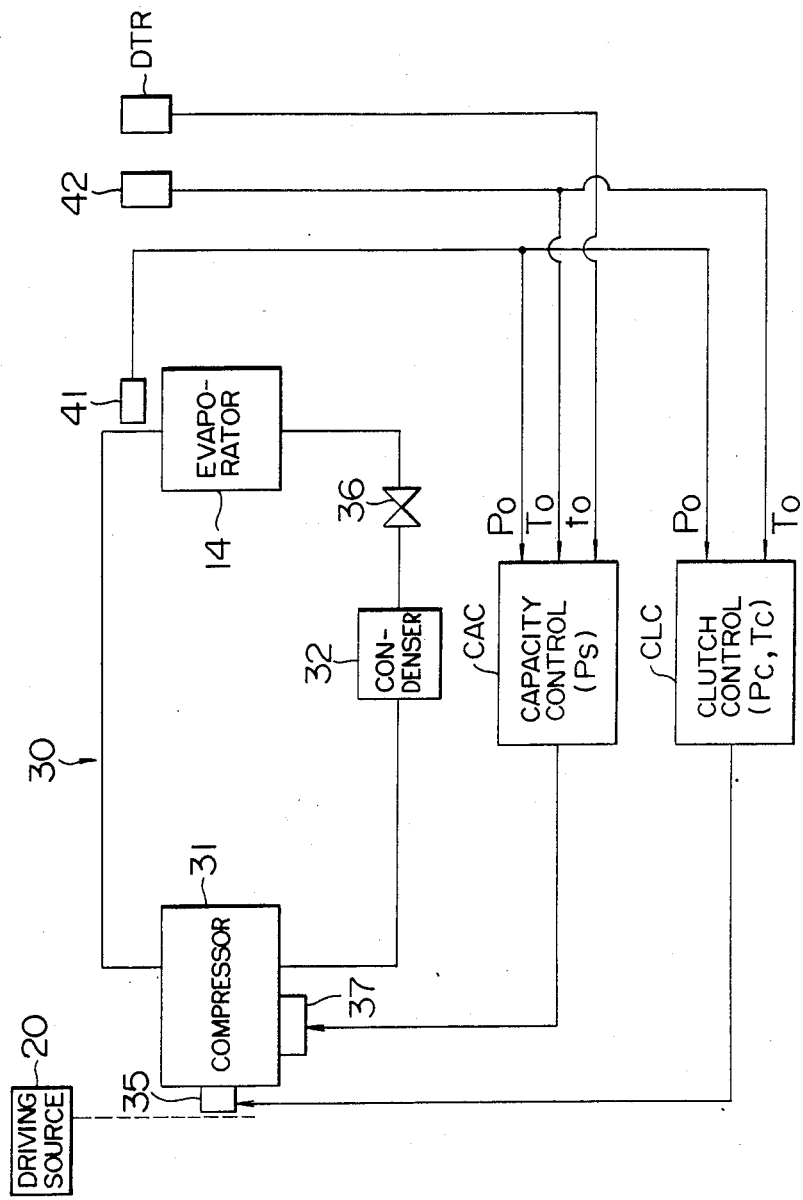
FIG. 2 is a block diagram illustrating a second technical concept of the present invention.

FIG. 2 shows a refrigeration system in accordance with a second technical concept of the present invention. The refrigeration system comprises a refrigeration cycle 30 which includes a compressor 31 having a variable capacity for compressing a refrigerant, and an evaporator 14 connected to the compressor 31 for evaporating the compressed refrigerant. A driving source such as an engine 20 mounted on a vehicle, for example, is adapted to drive the compressor 31. Clutch means 35 is movable between an engaged position where the driving source 20 is drivingly connected to the compressor 31 to allow the driving force from the driving source 20 to be transmitted to the compressor 31 and a disengaged position where the driving source 20 is disconnected from the compressor 31 to prevent the driving force from the driving source 20 from being transmitted to the compressor 31. The first detecting means such as a pressure sensor 41, for example, is provided for detecting pressure of the refrigerant evaporated by the evaporator 14 to generate a signal Po representative of the pressure. Second detecting means such as a temperature sensor 42, for example, is provided for detecting temeprature relating to a cooling condition of the evaporator 14 to generate a signal To representative of the temperature. Third detecting means DTR is provided for detecting at least one physical parameter relating to a cooling load to generate a signal to representative of the cooling load. Capacity control means CAC is operative in response to the signal To from the second detecting means 42 and the signal to from the third detecting means DTR to determine an aimed pressure Ps for controlling a discharge capacity of the compressor 31 to cause the pressure Po detected by the first detecting means 41 to approach the aimed pressure Ps. Clutch control means CLC is operative in response to the signal Po from the first detecting means 41 and the signal To from the second detecting means 42 for judging whether or not frosting occurs on the evaporator 14 to control the clutch means 35 so as to move the same to the disengaged position when it is judged that the frosting occurs on the evaporator 14, and to move the clutch means 35 to the engaged position when it is judged that no frosting occurs on the evaporator 14, and for judging whether or not the refrigerant in the refrigeration cycle 30 is insufficient in quantity to control the clutch means 35 so as to move the same to the disengaged position when it is judged that the refrigerant in the refrigeration cycle 30 is insufficient in quantity.

The at least one physical parameter may include temperature in a space to be air-conditioned, temperature of air to be introduced into a duct of an air-conditioning system, an amount of sunshine incident upon the space to be air-conditioned, a position of a damper, and/or temperature of a cooling liquid for cooling the driving source 20. The damper is disposed in the duct and is movable between a first position where the entire air having passed through the evaporator 14 is caused to pass through a heater disposed in the duct at a position downstream of the evaporator 14 with reference to air flow passing through the duct for heating the air having passed through the evaporator 14 by the cooling liquid, a second position where the entire air having passed through the evaporator 14 bypasses the heater, and any position between the first and second positions where a portion of the air having passed through the evaporator 14 is caused to pass through the heater and the remaining air bypasses the heater.

Figure 3:
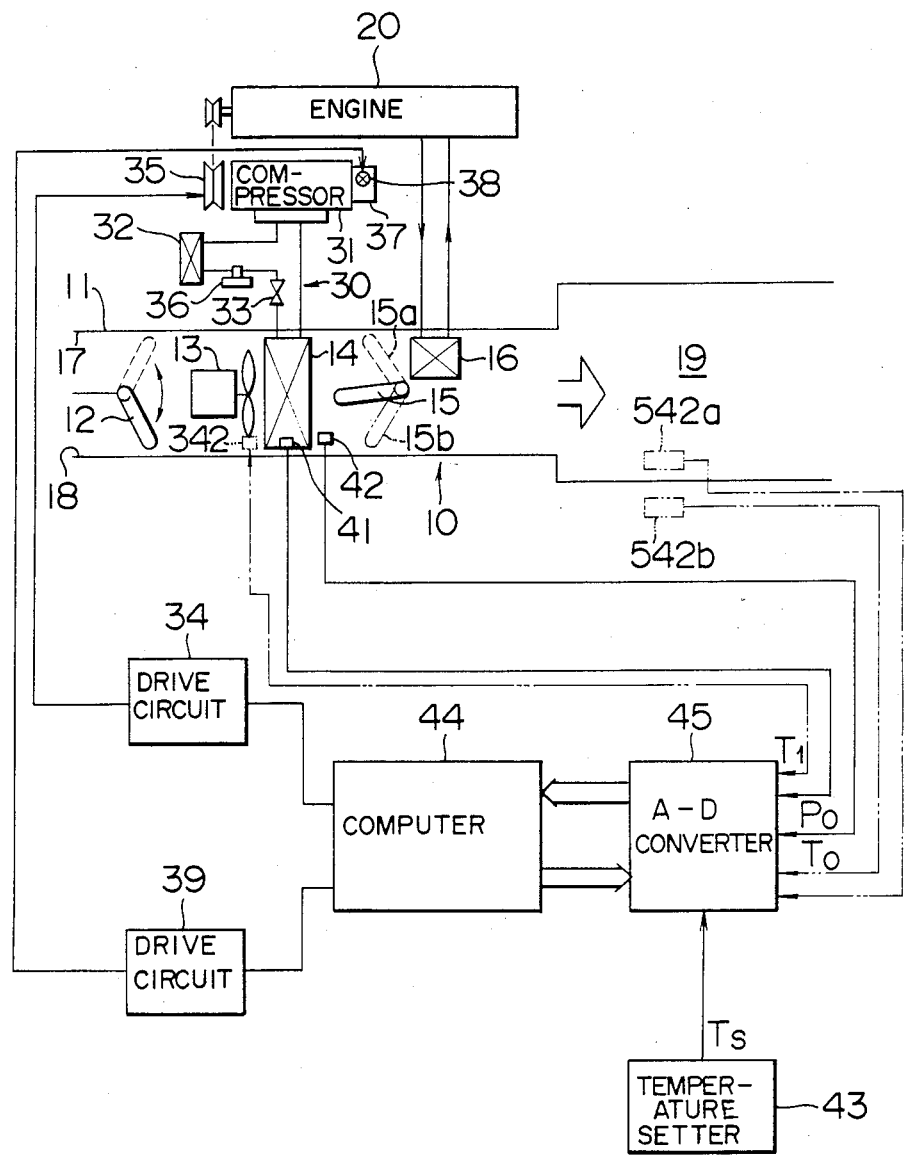
FIG. 3 is a block diagram schematically illustrating a refrigeration system in accordance with a first embodiment of the present invention embodying the first technical concept shown in FIG. 1.

Referring to FIG. 3, a refrigeration system in accordance with a first embodiment of the present invention which embodies the first technical concept shown in FIG. 1 is illustrated as being used with an air conditioning system for an automotive vehicle, generally designated by the reference numeral 10. The air conditioning system 10 for the automotive vehicle comprises an air duct 11 and a door 12 for change-over of indoor air to and from outdoor air, a blower 13, an evaporator 14, an air-mixing damper 15 and a heater 16 successively arranged in the duct 11 from an upstream end thereof (left end in FIG. 3) toward a downstream end of the duct 11 (right end in FIG. 3). The evaporator 14 is a component common to a refrigeration cycle to be described later.

The change-over door 12 is manually movable between a position where an outdoor-air inlet 17 is opened to allow the outdoor air to be introduced into the air duct 11 from the exterior of the vehicle and a position where an indoor-air inlet 18 is opened to allow the air within a vehicle compartment 19 to be recirculated into the air duct 11.

The blower 13 is adapted to draw the air from the outdoor-air inlet 17 or from the indoor-air inlet 18 and to deliver the air to the evaporator 14 as air flow of flow rate corresponding to the rotational speed of the blower 13. The air flow from the blower 13 is cooled in the evaporator 14 by latent heat upon the evaporation of a refrigerant therein and is delivered toward the air-mixing damper 15 as cool air.

The heater 16 is adapted to receive cooling water of high temperature (hot water) from an internal combustion engine 20 to heat the cooled air flow having passed through the evaporator 14, to thereby form hot air. The air-mixing damper 15 is adjustable in angular position by a temperature control lever (not shown) on an air-conditioning control panel (not shown) through a link mechanism (not shown). The control panel is usually disposed adjacent an instrument board within the compartment 19.

Thus, a portion of the cool air from the evaporator 14 is admitted into the heater 16, in dependence upon the angular position of the air-mixing damper 15, and is heated by the heater 16, while the remaining cool air from the evaporator 14 bypasses the heater 16. The heated air having passed through the heater 16 and the cool air bypassing the heater 16 are mixed with each other in an air flow path downstream of the heater 16 thereby producing air flow of a predetermined temperature in accordance with the angular position of the damper 15, which air flow is blown into the vehicle compartment 19.

In this case, when the air-mixing damper 15 occupies a position 15a indicated by the broken line, the entire mass of cool air from the evaporator 14 bypasses the heater 16 and is directly blown into the vehicle compartment 19 so that the maximum cooling capacity is achieved. When the air-mixing damper 15 occupies a position 15b indicated by the two-dot-and-dash line, the entire cool air from the evaporator 14 passes through the heater 16 and is heated thereby and, therefore, the maximum heating capacity is achieved.

A refrigeration cycle, generally designated by the reference numeral 30, is of a known construction comprising a compressor 31 of a variable capacity type, the above-described evaporator 14, a condenser 32, an expansion valve 33 forming a pressure reducing device, and the like. Gaseous refrigerant in the evaporator 14 which is evaporated by the heat exchange with the air flow from the blower 13 is delivered to a suction port of the compressor 31 of the variable capacity type. The compressor 31 is drivingly connected to the engine 20 through an electromagnetic clutch 35 energized by a drive circuit 34, and is driven by the engine 20 upon the energization of the electromagnetic clutch 35 to compress the gaseous refrigerant fed from the evaporator 14, to thereby generate the refrigerant under high pressure and high temperature. The refrigerant is then cooled and liquefied (condensed) by the condenser 32. The liquefied refrigerant is stored in a gas-liquid separator 36. Subsequently, the liquefied refrigerant is caused to pass through the expansion valve 33 so as to be expanded and decompressed to form the refrigerant of low pressure and low temperature in the form of mist. The refrigerant in the form of mist is again delivered to the evaporator 14. When the electromagnetic clutch 35 is in a deenergized condition, the compressor 31 is disconnected from the engine 20 and is suspended in operation.

The compressor 31 has incorporated therein a mechanism 37 for varying the discharge capacity of the cooling medium or refrigerant. The mechanism 37 has an electromagnetic valve 38 adapted to be opened and closed by a drive circuit 39. The mechanism 37 for varying the discharge capacity is so constructed that, as disclosed in Japanese Patent Laid-Open No. 58-155287, the opening and closing of the electromagnetic valve which controls back pressure of a capacity adjusting member are controlled in accordance with a magnitude of duty ratio.

A pressure sensor 41 is disposed in a suction pipe of the compressor 31 or in a discharge pipe of the evaporator 14, and detects the evaporating pressure Po of the refrigerant in the pipe to issue an analog signal corresponding in level to the pressure Po. A temperature sensor 42 consisting of a thermistor is arranged adjacent a blowing-out surface of the evaporator 14 and detects the temperature To of the air immediately after having passed through the evaporator 14, i.e., the blown-out air temperature to issue an analog signal corresponding in level to the detected temperature To.

An aimed or desired value Ts of the blown-out air temperature To is set by a vehicle occupant's manual operation of a temperature setter 43 provided in the vehicle compartment 19. The temperature setter 43 is mounted on the air-conditioning control panel, and is adapted to be operated by the occupant's manual operation of the temperature control lever on the air-conditioning control panel. The temperature control lever adjusts the angular position of the previously described air-mixing damper 15 so as to control the temperature of the air to be blown into the vehicle compartment 19. A variable resistor may be used, for example as the temperature setter 43.

The analog signal from the temperature sensor 42, the analog signal from the pressure sensor 41 and the analog signal from the temperature setter 43 are supplied to a computer 44 through an A-D converter 45.

The digital computer 44 is constituted by a microcomputer consisting of a single LSI chip, and is adapted to receive a constant voltage from a constant-voltage circuit (not shown) so as to be ready for operation. In this case, the constant-voltage circuit is operative in response to a closure of an ignition switch (not shown) of the vehicle engine 20 to receive a DC voltage from a DC power source (battery) mounted on the vehicle, to generate the above-described constant voltage. The microcomputer 44 comprises a central processing unit (hereinafter referred to as "CPU"), memorys, an I/O interface (hereinafter referred to as "I/O") and a clock circuit. The CPU, memorys (ROM, RAM), I/O and clock circuit are connected to each other through bus lines. The memory (Random Access Memory) of the microcomputer 44 is adapted to receive the digital signals from the A-D converter 45 through the I/O so as to temporarily store these signals and selectively supply these signals to the CPU. The clock circuit of the microcomputer 44 cooperates with a quartz oscillator to generate clock signals having a predetermined frequency, to thereby allow the operation of a predetermined control program in the microcomputer 44 to be carried out on the basis of the clock signals.

The above-described predetermined control program is preliminarily stored in the memory (Read Only Memory) of the microcomputer 44 in order to carry out the computing operation by the microcomputer in the manner as described later.

Figure 4:
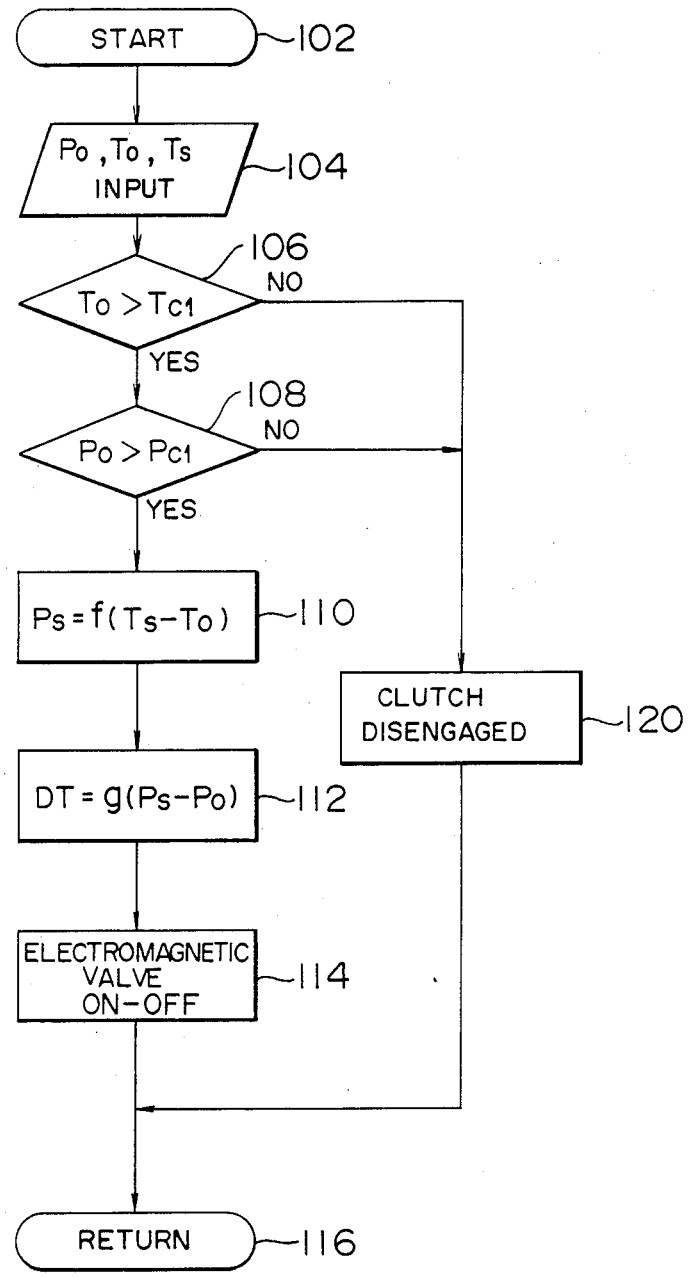
FIG. 4 is a flow chart showing a control program of the refrigeration system shown in FIG. 3.

FIG. 4 is a flow chart illustrating the control program to be effected by the computer 44 shown in FIG. 3.

First, the computer 44 receives the constant voltage from the constant-voltage circuit so as to be ready for operation, and commences the computing operation at a step 102. Then, the blown-out air temperature To, the aimed temperature Ts set by the manual operation of the temperature control lever on the air-conditioning control panel and the refrigerant evaporating pressure Po in the evaporator are inputted at a step 104 through the A-D converter 45 and are temporarily stored in the memory (RAM) of the computer 44. Subsequently, the To is compared with a first set temperature Tc1 (on the order of about 3° C.) at a step 106. The Tc1 has been preliminarily set and stored in the memory (ROM) of the computer 44. If the comparison indicates To≦Tc1, the cooling capacity of the evaporator 14 is judged excessive, and the output from the step 106 is supplied to a step 120 where a command signal for the disengagement of the clutch 35 is supplied to the clutch drive circuit 34. On the basis of the command signal, the clutch drive circuit 34 causes the clutch 35 to be disengaged (suspension in operation of the compressor), to thereby prevent the frosting on the evaporator 14. If To>Tc1 in the step 106, the output therefrom is supplied to a step 108 where the Po is compared with a first set pressure Pc1 (on the order of 0.5 kg/cm$^2$) preliminarily stored in the memory (ROM) of the computer 44. If Po≦Pc1, the refrigerant is judged insufficient in quantity for the operation, so that the output of the step 108 is supplied to the step 120 where the clutch 35 is disengaged in the same manner as described above. If Po>Pc1 in the step 108, the quantity of the refrigerant is judged proper and the output of the step 108 is supplied to a step 110 where the aimed value Ps of the evaporating pressure of the refrigerant in the evaporator 14 is set as Ps=f (Ts−To). In other words, this aimed pressure Ps is expressed as a function of the difference between the aimed temperature Ts and the actual blown-out air temperature To. The output of the step 110 is then supplied to a step 112 where the duty ratio DT on ON-OFF of the electromagnetic valve 38 of the capacity varying mechanism 37 is calculated on the basis of the Ps and Po. Subsequently, in a step 114, pulse signals to energize and deenergize the electromagnetic valve 38 on the basis of the duty ratio DT are supplied to the drive circuit 39. On the basis of the pulse signals, the drive circuit 39 causes the electromagnetic valve 38 to be energized or deenergized to vary the refrigerant pressure to be applied to the capacity varying mechanism 37 of the compressor 31, to thereby allow the discharge capacity of the compressor to be varied.

In the first embodiment of the present invention as described above, the control for preventing frosting on the evaporator 14 is performed in the step 106 on the basis of the detected value Po of the refrigerant evaporating pressure detected by the pressure sensor 41, the blown-out air temperature To detected by the temperature sensor 42 and the aimed temperature Ts set by the manual operation of the temperature control lever. The control for preventing seizure of the compressor due to insufficient amount of the refrigerant is performed in the step 108. In addition, the control of the capacity of the compressor is performed in the steps 110–114 so as to obtain the appropriate capacity of the compressor corresponding to the required cooling capacity of the evaporator 14.

Second to fifth embodiments of the present invention to be described hereinafter with reference to FIGS. 5–8 are substantially similar to the first embodiment shown in FIGS. 3 and 4. Accordingly, only differences of the second to fifth embodiments from the first embodiment will be described.

Figure 5:
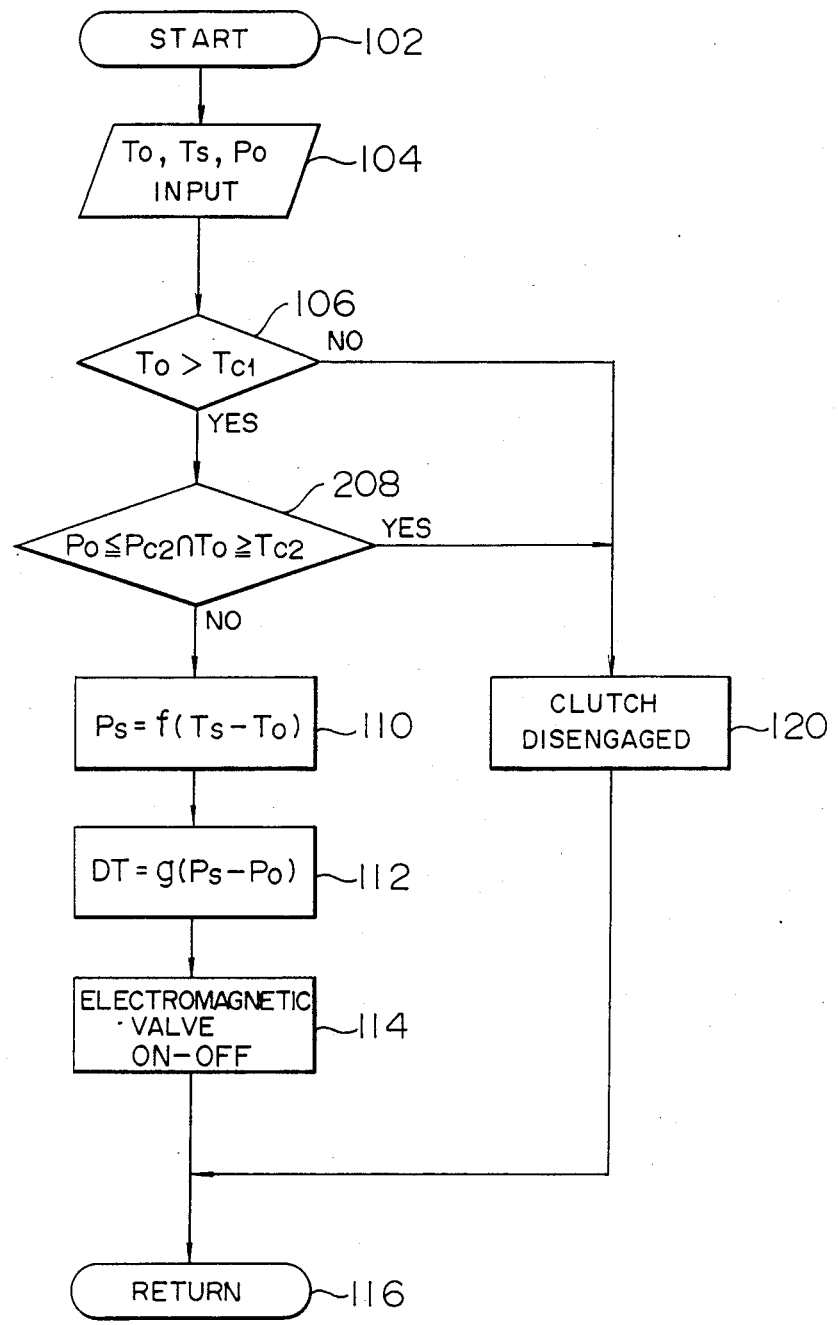
FIG. 5 is a flow chart showing a control program of a refrigeration system in accordance with a second embodiment of the present invention.

FIG. 5 shows a flow chart of a control program of the second embodiment. In the second embodiment, conditions on the basis of which the quantity of the refrigerant is judged insufficient are that the detected pressure Po is equal to or lower than a second set pressure Pc2 (on the order of 1.0 kg/cm$^2$) and the detected temperature To is equal to or higher than a second set temperature Tc2 (on the order of 5°–10° C.) as indicated in a step 208.

Figure 6:
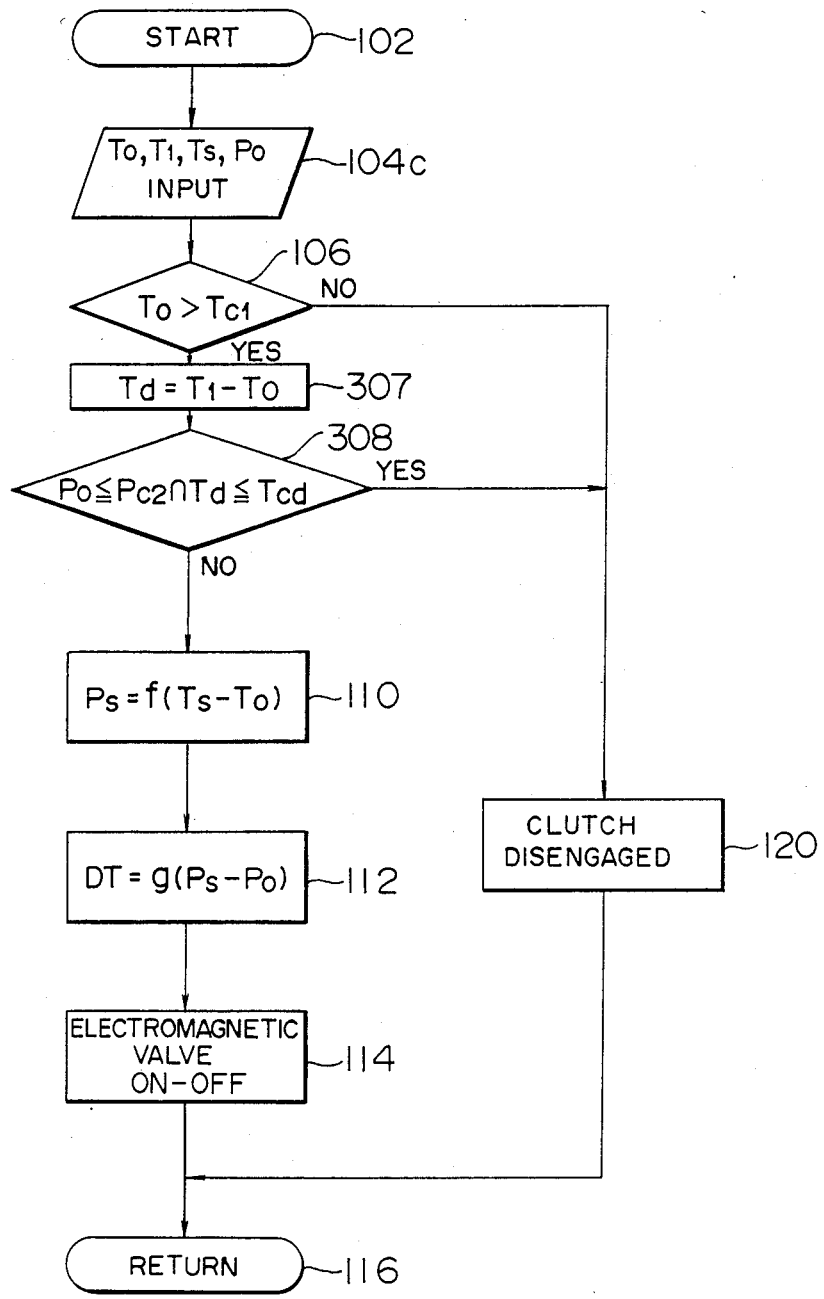
FIG. 6 is a flow chart showing a control program of a refrigeration system in accordance with a third embodiment of the present invention.

FIG. 6 shows a flow chart of a control program of the third embodiment. In the third embodiment, a temperature T1 of air to be drawn into the evaporator is detected by a temperature sensor 342 shown by the two-dot-and-dash line in FIG. 3, in addition to the detection of the blown-out air temperature To by means of the temperature sensor 42 (FIG. 3). In a step 307, a temperature difference Td is obtained as Td=T1−To, and in a step 308, the quantity of the refrigerant is judged insufficient if the temperature difference Td is equal to or lower than a set temperature difference Tcd (on the order of 5° C.) and the detected pressure Po is equal to or lower than a second set pressure Pc2 (on the order of 1.0 kg/cm$^2$).

Figure 7:
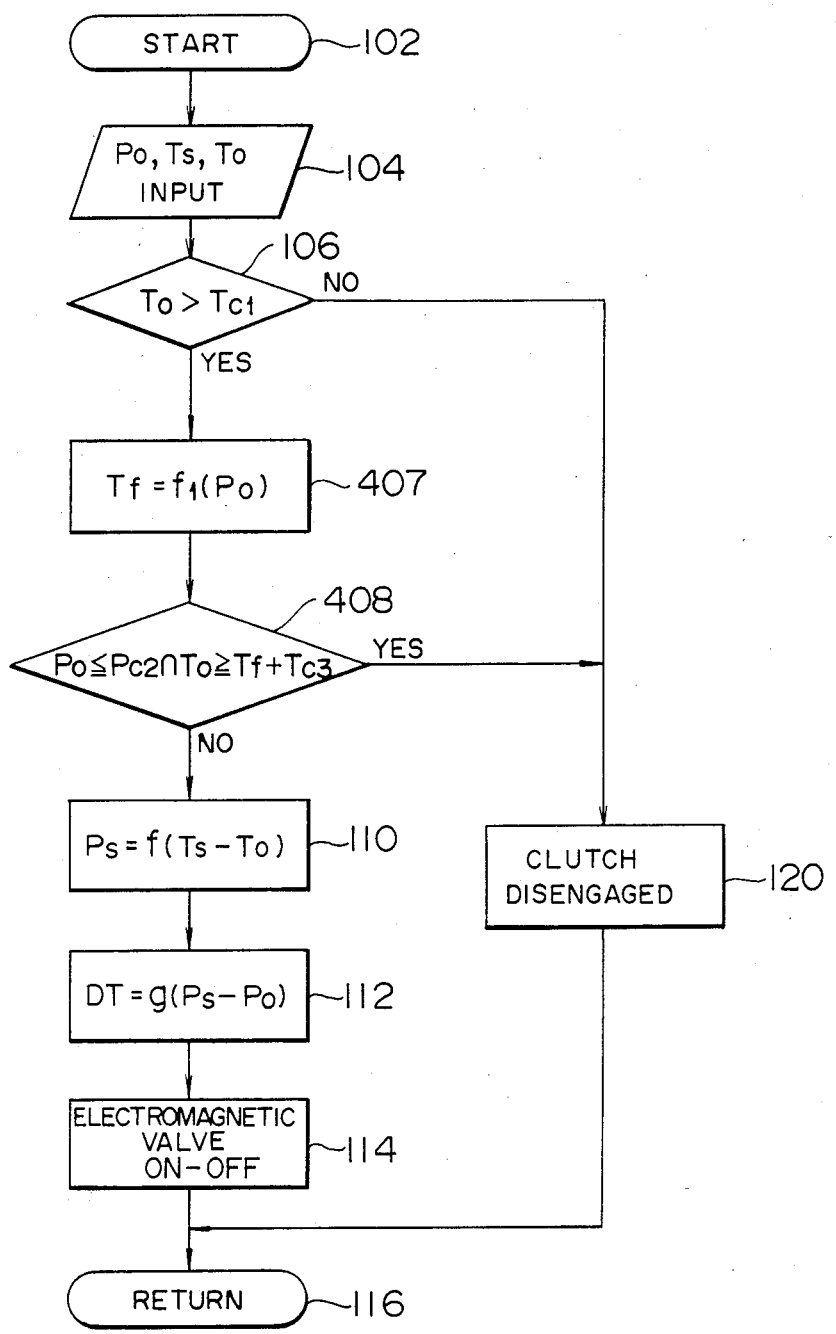
FIG. 7 is a flow chart showing a control program of a refrigeration system in accordance with a fourth embodiment of the present invention.

FIG. 7 shows a flow chart of a control program of the fourth embodiment. In the fourth embodiment, a saturated temperature Tf of the refrigerant at the detected pressure Po is calculated in a step 407, and the quantity of the refrigerant is judged insufficient in a step 408 if the detected pressure Po is equal to or lower than the second set pressure Pc2 (on the order of 1.0 kg/cm$^2$) and if To$\geq$Tf+Tc3 is obtained by the comparison of the detected temperature To with the sum (Tf+Tc3) of the saturated temperature Tf and a third set temperature Tc3 (on the order of 15°–20° C.).

Figure 8:
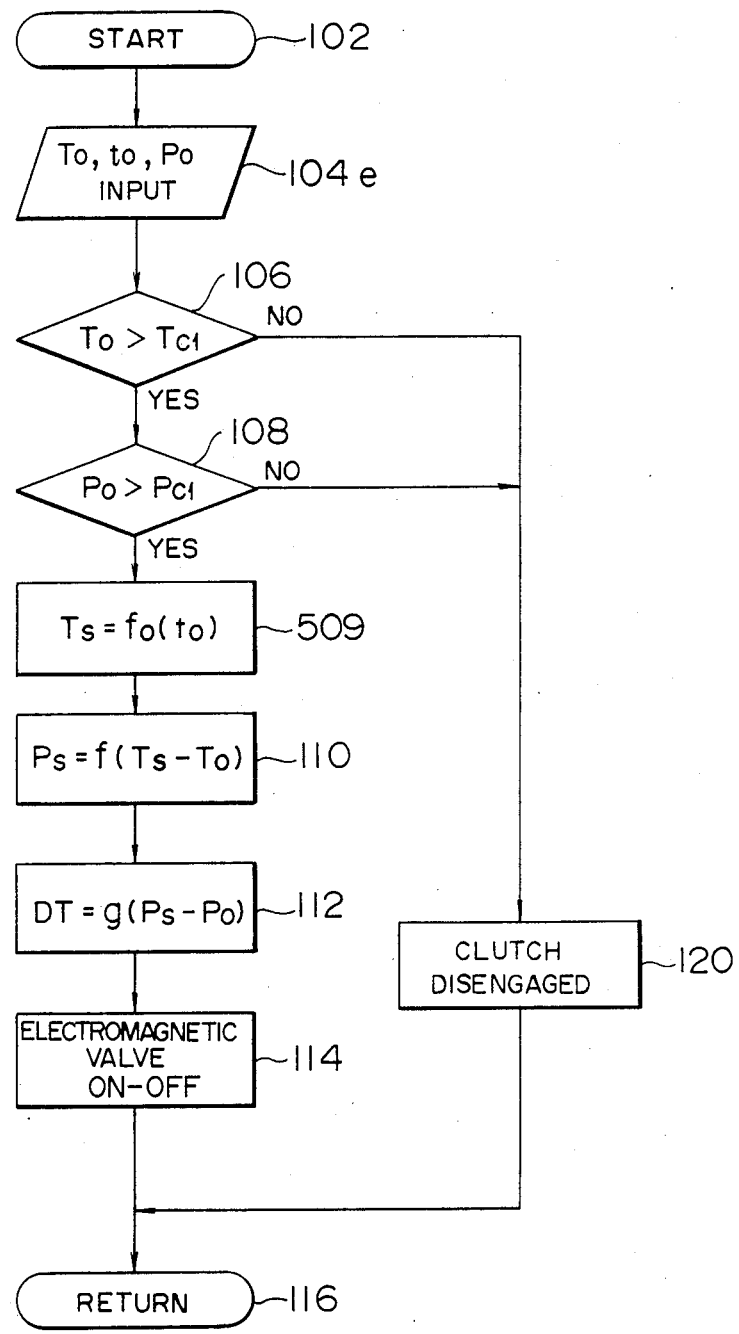
FIG. 8 is a flow chart showing a control program of a refrigeration system in accordance with a fifth embodiment of the present invention.

FIG. 8 shows a flow chart of a control program of the fifth embodiment. In the fifth embodiment, temperature to relating to a cooling load such as indoor air temperature or temperature of air within the vehicle compartment and outdoor air temperature or temperature of atmospheric or ambient air is detected by temperature sensors 542a and 542b shown by the two-dot-and-dash line in FIG. 3, in addition to the detection of the Po and To. In a step 509, the aimed temperature Ts of the air having passed through the evaporator 14 is obtained on the basis of the detected temperature to as Ts=fo (to).

In the step 106 in the second to fifth embodiments shown in FIGS. 5–8, respectively, Po may be compared with a third set pressure Pc3 (on the order of 1.6–1.8 kg/cm$^2$) in substitution for the comparison of To with Tc1. In this case, the electromagnetic clutch 35 (FIG. 3) is disengaged when Po is lower than Pc3 thereby preventing the frosting on the evaporator. The third set pressure Pc3 is preliminarily set and stored in the memory (ROM) of the computer.

Figure 9:
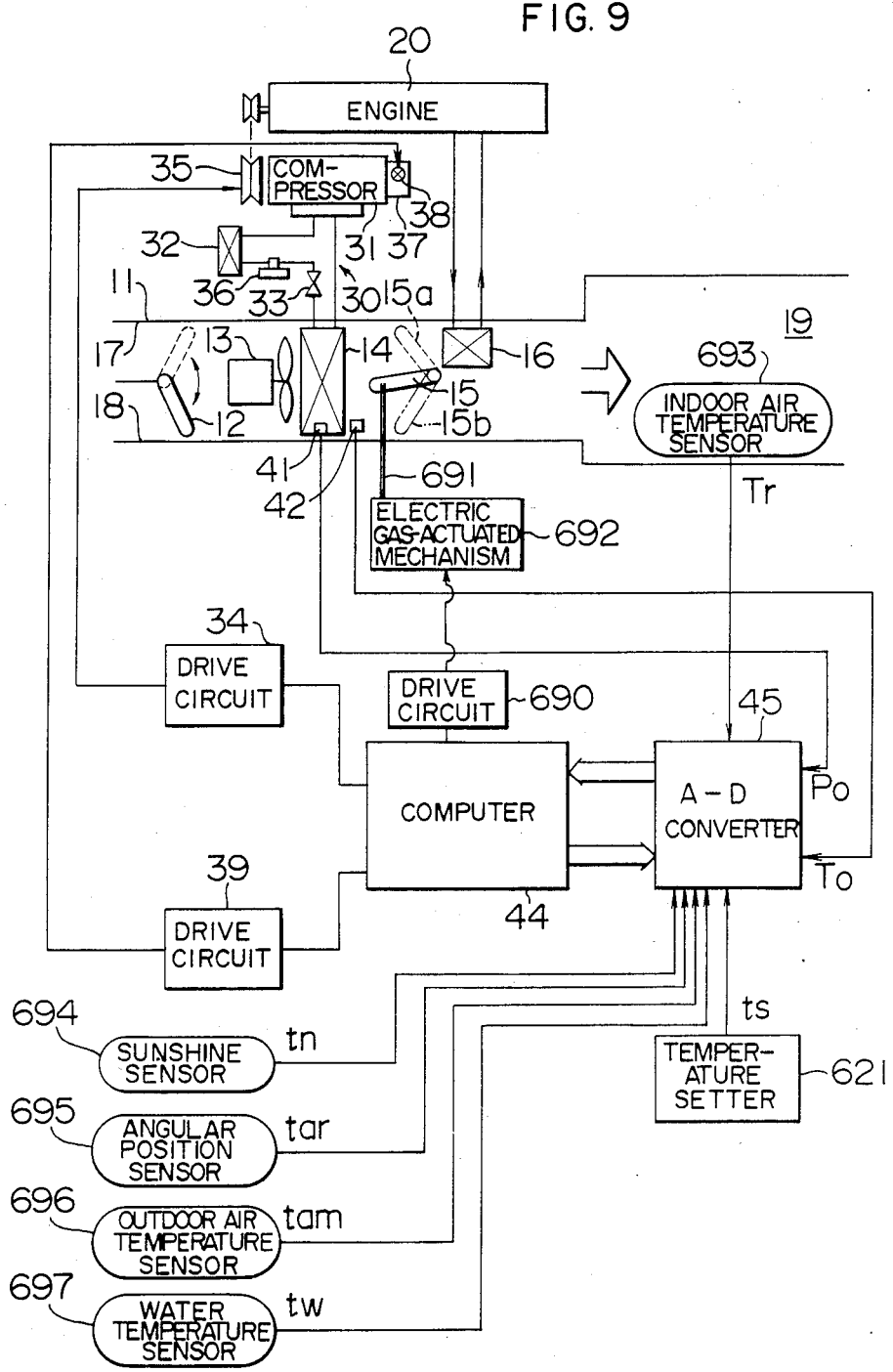
FIG. 9 is a block diagram schematically illustrating a refrigeration system in accordance with a sixth embodiment of the present invention.
Figure 10:
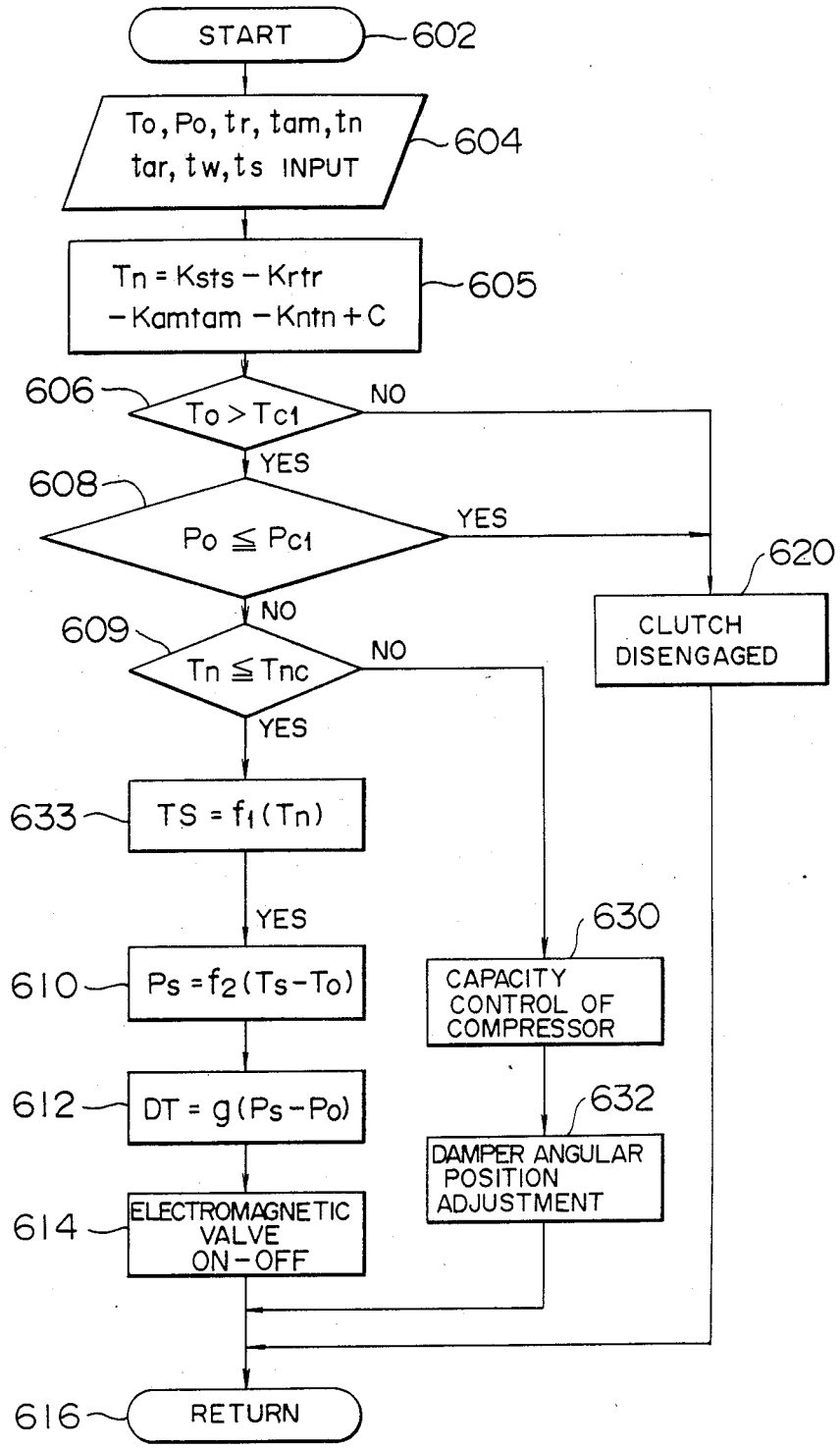
FIG. 10 is a flow chart showing a control program of the refrigeration system shown in FIG. 9.

FIGS. 9–11 show a general construction of a sixth embodiment of the present invention which is applied to an automatic air-conditioning system for automatically controlling temperature within a vehicle compartment 19.

The general construction of the sixth embodiment is substantially similar to the first embodiment shown in FIG. 3, and only differences of the sixth embodiment from the first embodiment will be described hereinafter.

An air-mixing damper 15 is connected to a rod 691 of an electric gas-actuated mechanism 692 comprising a combination of a well-known vacuum diaphragm and an electromagnetic valve. A drive circuit 690 is adapted to actuate the mechanism 692 in response to an output from the computer 44. When the electric gas-actuated mechanism 692 has applied thereto the atmospheric pressure or a vacuum from an internal combustion engine 20 to extend or retract the rod 691, the angular position tar of the damper 15 is moved in response to the extension or retraction of the rod 691. When the rod 691 is fully extended, the air-mixing damper 15 occupies a position 15a (opening degree: 0%) indicated by the broken line in FIG. 9, so that entire cool air flow from an evaporator 14 bypasses a heater 16 and is directly blown into a vehicle compartment 19. On the other hand, when the rod 691 is fully retracted, the air-mixing damper 15 occupies a position 15b (opening degree: 100%) indicated by the two-dot-and-dash line in FIG. 9, so that the entire cool air flow from the evaporator 14 enters the heater 16 and is heated thereby. In addition, when the electric gas-actuated mechanism 692 is simultaneously blocked from the atmospheric pressure and the vacuum from the internal combustion engine 20 to stop the movement of the rod 691, the air-mixing damper 15 is maintained stationary at an angular position corresponding to the stopped position of the rod 691.

In the sixth embodiment, as physical amounts in relation to a heat load on the air conditioning, an indoor air temperature tr, an outdoor air temperature tam, an amount of sunshine tn at a position adjacent a window within the vehicle compartment, the angular position tar of the air-mixing damper 15 and a water temperature tw at an inlet of the heater 16 are detected by an indoor air temperature sensor 693, an outdoor air temperature sensor 696, a sunshine sensor 694, an angular position sensor 695 and a water temperature sensor 697, respectively. The detected values are supplied to a computer 44 through an A-D converter 45. Further, a set temperature ts within the vehicle compartment 19 is determined by a temperature setter 621 which is disposed within the compartment 19 and is manually operated by an occupant in the vehicle. The set temperature ts is also supplied to the A-D converter 45. Capacity control is performed with the above detected and set values being taken into consideration.

FIG. 10 is a flow chart showing a control program of the sixth embodiment shown in FIG. 9.

In like manner as in the case of the first embodiment shown in FIG. 3, the computer 44 receives a constant voltage from a constant-voltage circuit so as to be ready for the operation. The operation of the computer 44 is commenced at a step 602. In a step 604, the blown-out air temperature To, the evaporating pressure Po of the refrigerant in the evaporator, the indoor air temperature tr, the outdoor air temperature tam, the sunshine amount tn, the angular position tar of the damper, the heater inlet water temperature tw and the set temperature ts are inputted. Then, a blown-out air temperature Tn required for maintaining the temperature in the vehicle compartment at the set temperature ts is calculated in a step 605. Tn is given by Tn=Ks·ts−Kr·tr−Kam·tam−Kn·tn+C. The respective gains Ks, Kr, Kam and Kn and the constant C are preliminarily stored in the memory (ROM).

A subsequent step 606 is similar to the step 106 of the first embodiment shown in FIG. 4. In a step 608, the refrigerant is judged insufficient in quantity if Po≦Pc1 (refer to the first embodiment), so that the output is supplied to a step 620 where the electromagnetic clutch 35 is disengaged.

In a subsequent step 609, it is judged whether the indoor temperature control should be performed by the capacity control or by the damper position adjustment. In other words, in the step 609, the required blown-out air temerature Tn is compared with a control judging temperature Tnc (a value preliminarily set and stored in the memory (ROM)). If the comparison indicates Tn≦Tnc, the output from the step 609 is supplied to a step 633 where an aimed or desired temperature Ts of the air blown out of the evaporator is determined as shown in FIG. 11. In FIG. 11, the abscissa represents the required blown-out air temeprature Tn and the ordinate represents the aimed temperature Ts and the angular position tar of the damper. The capacity control of the compressor 31 is performed correspondingly to the aimed temperature Ts at steps 610–616 which are similar to the steps 110–116 of the first embodiment, to thereby vary the cooling capacity of the evaporator 14. At this stage, the air-mixing damper 15 occupies the angular position 15a, so that no heating effect is given by the heater 16. Accordingly, the performing of the capacity control, as described above, to vary the cooling capacity of the evaporator 14 causes the temperature of air blown into the vehicle compartment to be varied to enable the temperature in the comaprtment to be controlled to reach the set temprature ts. If Tn>Tnc in the step 609, then the output thereof is supplied to steps 630–632 where, in addition to the capacity control, the heating by the heater 16 is adjusted by the adjustment of the angular position of the air-mixing damper 15. In this case, the aimed temperature Ts of the air blown out of the evaporator is determined by the required blown-out air temperature Tn, and the capacity control is performed in such a manner that the detected value To of the blown-out air temperature coincides with the Ts. If, however, the required blown-out air temperature Tn is higher than another control judging temperature Tnc1 (refer to FIG. 11) which is further higher than the control judging temperature Tnc by a constant value, then the electromagnetic clutch 35 is disengaged to suspend the operation of the compressor 31, and the indoor air temperature is controlled solely by the adjustment of the angular position tar of the air-mixing damper (in other words, by the adjustment of the heating by the heater 16).

The aimed damper angular position tars obtained by the calculation in the step 632 is represented by the following equation:

tars=100×(Tn−Tnc)/(tw−Tnc−Co), where Co is a constant preliminarily set in the memory (ROM).

The angular position of the damper is compared with the aimed damper angular position tars, and a command signal is issued depending upon the result of the comparison so that the electric gas-actuated mechanism 692 is supplied with the atmospheric pressure or the vacuum. In this case, a hysteresis may be given in the comparison process, a specific example of which is disclosed in Japanese Patent Laid-Open No. 55-77659.

The computer program described above is carried out repeatedly. This allows the system to adjust the discharge capacity of the compressor 31 in accordance with the required cooling degree, and to adjust the angular position of the air-mixing damper 15, so that the indoor air temperature is maintained at the set temperature ts, and the clutch 35 is disengaged upon the excess of the cooling capacity and upon the insufficiency in quantity of the refrigerant. Thus, the frosting on the evaporator 14 and the seizure of the compressor 31 are prevented.

What is claimed is:

1. A refrigeration system comprising:
   a refrigeration cycle including a compressor having a variable capacity for compressing a refrigerant, and an evaporator connected to an inlet portion of said compressor to allow the refrigerant evaporated therein to be drawn into said compressor;
   means for driving said compressor;
   clutch means movable between two positions, for: (1) in an engaged position, coupling said driving means to said compressor to allow the driving force from said driving means to be transmitted to said compressor, and (2) in a disengaged position, decoupling said driving means from said compressor to prevent the driving force from said driving means from being transmitted to said compressor;
   first detecting means for detecting a pressure of the refrigerant evaporated by said evaporator to generate a signal representative of the pressure;
   second detecting means for detecting a temperature relating to a cooling condition of said evaporator to generate a signal representative of the temperature;
   capacity control means for controlling a discharge capacity of said compressor to cause the pressure detected by said first detecting means to approach an aimed pressure; and
   clutch control means operative in response to the signal from said first detecting means and the signal from said second detecting means for: (1) judging whether frosting occurs on said evaporator, (2) moving said clutch means to said disengaged position when it is judged that said frosting occurs on said evaporator, (3) moving said clutch means to said engaged position when it is judged that no frosting occurs on said evaporator, (4) judging whether the refrigerant in said refrigeration cycle is insufficient in quantity and (5) moving said clutch means to said disengaged position when it is judged that the refrigerant in said refrigeration cycle is insufficient in quantity.

2. A refrigeration system as defined in claim 1, wherein said clutch control means is also for comparing the temperature detected by said second detecting means and a predetermined set temperature with each other to judge whether the frosting occurs on said evaporator.

3. A refrigeration system as defined in claim 1, wherein said clutch control means is also for: (6) judging that the refrigerant is insufficient in quantity when the pressure detected by said first detecting means is less than a predetermined set value.

4. A refrigeration system as defined in claim 1, wherein said clutch control means is also for: (6) judging that the refrigerant is insufficient in quantity when the pressure detected by said first detecting means is less than a predetermined set value and the temperature detected by said second detecting means is higher than a predetermined set value.

5. A refrigeration system as defined in claim 1, wherein
said second detecting means is also for detecting a temperature of air to be cooled by said evaporator and a temperature of air after being cooled by said evaporator, to generate signals representative of the respective temperatures,
said capacity control means is also for, in response to the signal from said second detecting means representative of the temperature of the air after being cooled, determining said aimed pressure,
said clutch control means is also for: (6) judging, in response to the signal from said second detecting means indicative of the temperature of the air after being cooled, whether frosting occurs on said evaporator, and (7) judging that the refrigerant is insufficient in quantity when the pressure detected by said first detecting means is less than a predetermined set value and a difference between the temperature of the air to be cooled by said evaporator and the temperature of the air after being cooled by said evaporator is lower than a predetermined set value.

6. A refrigeration system as defined in claim 1, wherein said clutch control means is also for determining a saturated temperature of the refrigerant corresponding to the pressure detected by said first detecting means, and for judging that the refrigerant is insufficient in quantity when the temperature detected by said second detecting means is higher than a set value determined on the basis of said saturated temperature of the refrigerant and the pressure detected by said first detecting means is lower than a predetermined set value.

7. A refrigeration system comprising:
a refrigeration cycle including a compressor having a variable capacity for compressing a refrigerant, and an evaporator connected to an inlet port of said compressor to allow the refrigerant evaporated at said evaporator to be drawn into said compressor;
means for driving said compressor;
clutch means movable between two positions, for: (1) in an engaged position, coupling said driving means to said compressor to allow the driving force from said driving means to be transmitted to said compressor, and (2) in a disengaged position, decoupling said driving means from said compressor to prevent the driving force from said driving means from being transmitted to said compressor;
first detecting means for detecting a pressure of the refrigerant evaporated by said evaporator to generate a signal representative of the pressure;
second detecting means for detecting a temperature relating to a cooling condition of said evaporator to generate a signal representative of the temperature;
capacity control means for controlling a discharge capacity of said compressor to cause the pressure detected by said first detecting means to approach an aimed pressure, said capacity control means determining said aimed pressure on the basis of the temperature detected by said second detecting means;
clutch control means operative in response to the signal from said first detecting means and the signal from said second detecting means for: (1) judging whether frosting occurs on said evaporator, (2) moving said clutch means to said disengaged position when it is judged that the frosting occurs on said evaporator, (3) moving said clutch means to said engaged position when it is judged that no frosting occurs on said evaporator, (4) judging whether the refrigerant in said refrigeration cycle is insufficient in quantity, and (5) moving said clutch means to said disengaged position when it is judged that the refrigerant in said refrigeration cycle is insufficient in quantity.

8. A refrigeration system as defined in claim 7, wherein said clutch control means is also for comparing the temperature detected by said second detecting means and a predetermined set temperature with each other to judge whether the frosting occurs on said evaporator.

9. A refrigeration system as defined in claim 7, wherein said clutch control means is also for: (6) judging that the refrigerant is insufficient in quantity when the pressure detected by said first detecting means is less than a predetermined set value.

10. A refrigeration system as defined in claim 7, wherein said clutch control means is also for: (6) judging that the refrigerant is insufficient in quantity when the pressure detected by said first detecting means is less than a predetermined set value and the temperature detected by said second detecting means is higher than a predetermined set value.

11. A refrigeration system as defined in claim 7, wherein:
said second detecting means is also for detecting a temperature of air to be cooled by said evaporator and a temperature of air after being cooled by said evaporator, to generate signals representative of the respective temperatures,
said capacity control means is also for, in response to the signal from said second detecting means representative of the temperature of the air after being cooled, determining said aimed pressure,
said clutch control means is also for: (6) determining, in response to the signal from said second detecting means indicative of the temperature of the air after being cooled, whether frosting occurs on said evaporator, and (7) determining whether the refrigerant is insufficient in quantity when the pressure detected by said first detecting means is less than a predetermined set value and a difference between the temperature of the air to be cooled by said evaporator and the temperature of the air after being cooled by said evaporator is lower than a predetermined set value.

12. A refrigeration system as defined in claim 7, wherein said clutch control means is also for determining a saturated temperature of the refrigerant corresponding to the pressure detected by said first detecting means, and for judging that the refrigerant is insufficient in quantity when the temperature detected by said second detecting means is higher than a set value determined on the basis of said saturated temperature of the refrigerant and the pressure detected by said first detecting means is lower than a predetermined set value.

13. A refrigeration system comprising:
a refrigeration cycle including a compressor having a variable capacity for compressing a refrigerant, and an evaporator connected to an inlet port of said compressor to allow the refrigerant evaporated at said envaporator to be drawn into said compressor;
means for driving said compressor;
clutch means movable between two positions, for: (1) in an engaged position, coupling said driving means is to said compressor to allow the driving force from said driving means to be transmitted to said compressor, and (2) in a disengaged position, decoupling said driving means from said compressor to prevent the driving force from said driving means from being transmitted to said compressor;
first detecting means for detecting a pressure of the refrigerant evaporated by said evaporator to generate a signal representative of the pressure;
second detecting means for detecting a temperature relating to a cooling condition of said evaporator to generate a signal representative of the temperature;
third detecting means for detecting at least one physical parameter relating to a cooling load to generate a signal representative of the cooling load;
capacity control means operative in response to the signal from said second detecting means and the signal from said third detecting means to determine an aimed pressure for controlling a discharge capacity of said compressor to cause the pressure detected by said first detecting means to approach said aimed pressure; and
clutch control means operative in response to the signal from said first detecting means and the signal from said second detecting means for: (1) judging whether frosting occurs on said evaporator, (2) moving said clutch means to said disengaged position when it is judged that the frosting occurs on said evaporator, (3) moving said clutch means to said engaged position when it is judged that no frosting occurs on said evaporator, (4) judging whether the refrigerant in said refrigeration cycle is insufficient in quantity, and (5) moving said clutch means to said disengaged position when it is judged that the refrigerant in said refrigeration cycle is insufficient in quantity.

14. A refrigeration system according to claim 13, further comprising an air-conditioning system, coupled to said refrigeration system and which comprises: (a) a duct having disposed therein said evaporator and having a downstream end communicating with a space to be air-conditioned, (b) a heater means disposed in said duct at a position downstream of said evaporator with reference to air flow passing through said duct, for heating the air having passed through said evaporator by a cooling liquid for cooling said driving source, and (c) damper means, disposed in said duct, for: (1) in a first position, causing the entire air mass having passed through said evaporator to pass through said heater, (2) in a second position, causing the entire air having passed through said evaporator to bypass said heater, and (3) in any position between said first and second positions, causing a portion of the air having passed through said evaporataor to pass through said heater and the remaining air to bypass said heater, said at least one physical parameter including: temperature in said space to be air-conditioned, temperature of air to be introduced into said duct, an amount of sunshine incident to said space to be air-conditioned, the position of said damper and temperature of said cooling liquid.

15. A refrigeration system as defined in claim 13, wherein said capacity control means determines said aimed pressure based on the temperature detected by said second detecting means.

16. A refrigeration system comprising:
a refrigeration cycle including a compressor having a variable capacity for compressing a refrigerant, and an evaporator connected to a suction port of said compressor so as to allow the refrigerant evaporated at said evaporator to be drawn into said compressor;
means for driving said compressor;
clutch means movable between two positions, for: (1) in an engaged position, coupling said driving means to said compressor to allow the driving force from said driving means to be transmitted to said compressor, and (2) in a disengaged position, decoupling said driving means from said compressor to prevent the driving force from said driving means from being transmitted to said compressor;
first detecting means for detecting a pressure of the refrigerant evaporated by said evaporator to generate a first signal representative of the pressure;
second detecting means for detecting a temperature relating to a cooling condition of said evaporator to generate a second signal representative of the temperature;
capacity control means for controlling a discharge capacity of said compressor to cause the pressure detected by said first detecting means to approach an aimed pressure; and
clutch control means, operative in response to at least one of the first and second signals, for: (1) determining whether frosting occurs on said evaporator, and (2) controlling said clutch means to move the same to said disengaged position when it is determined that frosting has occured on said evaporator;
wherein said capacity control means is also for determining said aimed pressure on the basis of the temperature detected by said second detecting means.

17. A refrigeration system as defined in claim 16, wherein said clutch control means is also for comparing the temperature detected by said second detecting means with a predetermined set temperature to determine whether the frosting occurs on said evaporator.

18. A refrigeration system as defined in claim 16, wherein said second detecting means detects: (1) a temperature of air to be cooled by said evaporator, (2) a temperature of air after cooled by said evaporator and a temperature of air after cooled by said evaporator to generate signals representative of the respective temperatures, and said capacity control means is also for, in response to the signal from said second detecting means representative of the temperature of the air after cooled, determining said aimed pressure.

* * * * *